US009599945B2

(12) United States Patent
Jeran et al.

(10) Patent No.: US 9,599,945 B2
(45) Date of Patent: Mar. 21, 2017

(54) METHODS AND SYSTEMS FOR DETERMINING AUTHENTICITY OF A CONSUMABLE PRODUCT

(71) Applicant: Hewlett-Packard Development Company, Houston, TX (US)

(72) Inventors: Paul L. Jeran, Boise, ID (US); Shell S. Simpson, Boise, ID (US); Stephen D. Panshin, Corvallis, OR (US); Jefferson P. Ward, Brush Prairie, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/908,709

(22) PCT Filed: Jul. 31, 2013

(86) PCT No.: PCT/US2013/052908
§ 371 (c)(1),
(2) Date: Jan. 29, 2016

(87) PCT Pub. No.: WO2015/016875
PCT Pub. Date: Feb. 5, 2015

(65) Prior Publication Data
US 2016/0187827 A1 Jun. 30, 2016

(51) Int. Cl.
*G03G 15/00* (2006.01)
*B41J 2/175* (2006.01)
*G06F 21/44* (2013.01)

(52) U.S. Cl.
CPC ...... *G03G 15/5091* (2013.01); *B41J 2/17546* (2013.01); *G06F 21/44* (2013.01);
(Continued)

(58) Field of Classification Search
CPC .......... G03G 15/5091; G03G 15/0863; G03G 21/1875; G03G 21/1892
(Continued)

(56) References Cited

U.S. PATENT DOCUMENTS 7,221,473 B2   5/2007   Jeran et al.
7,580,144 B2   8/2009   Wadley
(Continued)

FOREIGN PATENT DOCUMENTS

JP   2009300758      12/2009
KR   1020090076546    7/2009
WO   WO-2006021021    3/2006

OTHER PUBLICATIONS

Mattimore, et al. "A General Purpose Driver Board for the HP26 Ink-Jet Cartridge With Applications to Bioprinting"; IEEE; Mar. 18-21, 2010; pp. 510-513.
(Continued)

*Primary Examiner* — William J Royer
(74) *Attorney, Agent, or Firm* — Fabian Van Cott (57) ABSTRACT

Methods and systems are described to determine authenticity of a consumable product. The determining of authenticity may include communicating with a listing engine that contains a list of identifiers for consumable products classified as non-authentic, installing a consumable product in a host device where the consumable product stores an identifier in memory, and determining whether the consumable product matches one of the identifiers.

20 Claims, 4 Drawing Sheets

(52) U.S. Cl.
    CPC ............... *G06F 2221/2111* (2013.01); *G06F 2221/2129* (2013.01); *G06F 2221/2135* (2013.01); *G06F 2221/2149* (2013.01)

(58) Field of Classification Search
    USPC .......................................................... 399/12
    See application file for complete search history.

(56) References Cited

U.S. PATENT DOCUMENTS

| | | |
|---|---|---|
| 8,036,542 B2 | 10/2011 | Jeon |
| 8,621,212 B2 * | 12/2013 | Lim et al. ............... G06F 21/73 347/86 |
| 2006/0161571 A1 | 7/2006 | Neil et al. |
| 2007/0127936 A1 | 6/2007 | Miller |
| 2011/0087570 A1 | 4/2011 | Wilsher et al. |
| 2011/0154043 A1 | 6/2011 | Lim et al. |
| 2012/0134687 A1 | 5/2012 | Jones et al. |

OTHER PUBLICATIONS

PCT International Search Report and Written Opinion, Apr. 29, 2014, PCT Application No. PCT/US2013/052908, Korean Intellectual Property Office, 15 pages.

\* cited by examiner

METHODS AND SYSTEMS FOR DETERMINING AUTHENTICITY OF A CONSUMABLE PRODUCT

CROSS-REFERENCE TO RELATED APPLICATION

This application is a U.S. National Stage Application of and claims priority to International Patent Application No. PCT/US2013/052908, filed on Jul. 31, 2013, and entitled "METHODS AND SYSTEMS FOR DETERMINING AUTHENTICITY OF A CONSUMABLE PRODUCT," which is hereby incorporated by reference in its entirety.

BACKGROUND

Authentication is a process of proving or verifying that certain information is genuine. Authentication processes can use different mechanisms to ensure that the information is genuine. For example, a user identification code and a password may be used to verify that an author is who the author says he is when logging into a website to publish an online article.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

The principles described herein include a method of determining authenticity of a consumable product, such as a print cartridge. Such an example includes communicating with a listing engine that contains a list of identifiers for a consumable product classified as non-authentic, where a host device has a mechanism to secure the consumable product. In some examples, if the consumable product is not genuine, the method includes preventing the usage of the non-authenticated consumable product. In other examples, the non-authenticated consumable product may be allowed to be used with the host device.

Print cartridges can be authenticated upon installation into a printer so that for example a warranty eligibility of the print cartridge can be determined. In an example, third party print cartridges may not fall under warranties offered by an original printer company.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1A:
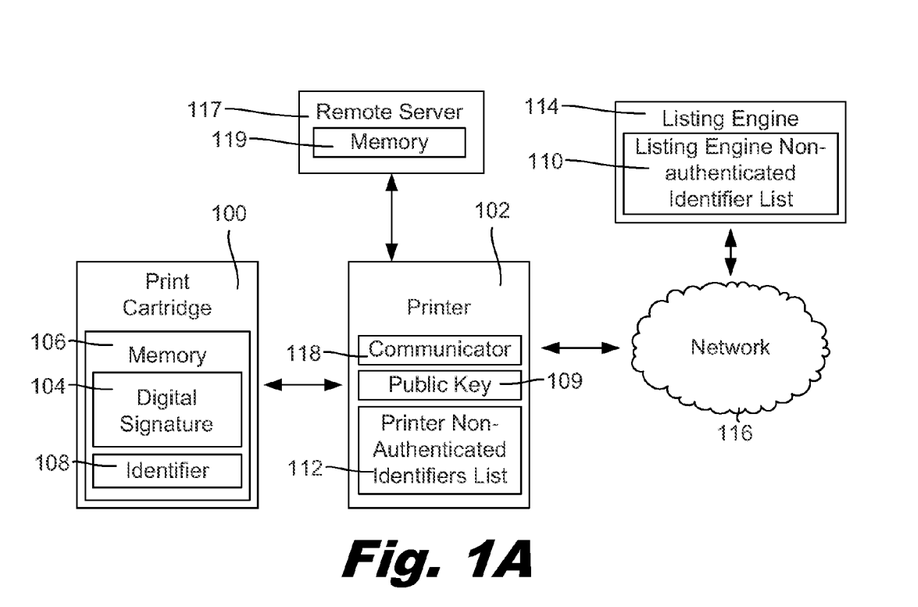
FIG. 1A is a diagram of an example of a consumable product and a device according to the principles described herein.

FIG. 1A is a diagram of an example of a consumable product and a device according to the principles described herein. In this example, the consumable product is a print cartridge (100) and the device is a printer (102). The print cartridge (100) may provide any appropriate supply to the printer (102) including ink, dry toner, wet toner, fluids, other materials, or combinations thereof. While this example is described with reference to the consumable product specifically being a print cartridge (100), any appropriate consumable product may be used. For example, the consumable product may be an oil filter, an air filter, another type of filter, a print cartridge, an erosion prone component of a machine, another type of component, or combinations thereof. Further, while this example is described with reference to specific types of devices, any appropriate type of device may be used in accordance with the principles described herein. For example, the device may be a two dimensional printer, a three dimensional printer, an automobile, a vehicle, a plane, a boat, construction equipment, machines, other types of devices, or combinations thereof.

In the example of FIG. 1A, the print cartridge (100) contains a digital signature (104) that is contained in memory (106). The digital signature (104) signs data stored on the print cartridge (100), such signed data contains a unique identifier (108) for that print cartridge (100). In response to being inserted into the appropriate receptacle in the printer (102), the printer (102) and the print cartridge (100) are positioned such to communicate with one another. For example, the printer's receptacle may include electrical contacts that are positioned to abut electrical contacts of the print cartridge (100), which completes an electrically conductive pathway on which the printer (102) and the print cartridge (100) can exchange data. In other examples, the receptacle is positioned such that the print cartridge (100) can wirelessly communicate with the printer (102). In response to being able to communicate, an authentication session between the printer (102) and the print cartridge (100) is initiated. The print cartridge (100) may request authentication to initiate the authentication session. However, in other examples, the printer (102) initiates the authentication session.

The printer (102) may use a public key (109), a symmetric key, another mechanism, or combinations thereof to interpret the digital signature (104). If the digital signature (104) does not appear to be genuine, the printer (102) will deny authentication. However, if the digital signature (104) appears to be genuine, the printer (102) will use an additional layer of scrutiny to ensure that the digital signature (104) was not copied.

The additional layer of scrutiny may include referencing a printer non-authenticated identifiers list (112) that is associated with print cartridges that failed authentication requests or are otherwise classified as non-authentic. The printer non-authenticated identifiers list (112) may be downloaded to the printer (102) from a listing engine (114) over a network (116), such as the internet. The listing engine (114) may contain a listing engine non-authenticated identifier list (110) that includes non-authentic identifiers supplied from the printer (102) and/or other printers. The print cartridges associated with the printer non-authenticated identifiers list (112) may have been denied authentication when they requested authentication with the printer (102) currently in an authentication session with the print cartridge or other printers at different locations. In some examples, each time a print cartridge (100) fails authentication, the printer (102) sends the identifier associated with the non-authenticated print cartridge to a common location, such as a cloud based web service.

In other examples, the non-authenticated identifiers may be added to the list if they were detected to be installed in too many printers. In such an example, the printers track both the authenticated identifiers and the non-authenticated identifiers. The listing engine (114) can analyze the authenticated identifiers, and if the occurrence of a particular authenticated identifier exceeds a predetermined threshold, the listing engine (114) may add that particular identifier to the listing engine non-authenticated identifier list (110).

In other examples, the non-authenticated identifiers are added to the listing engine non-authenticated identifier list (110) manually. The number of printers in which a print cartridge has been installed may be tracked via the identifier. If this number exceeds a predetermined threshold, this suggests that the identifier has been copied and the identifier may then be added to the listing engine non-authenticated identifier list (110). In other examples, the common location collects printer non-authenticated identifiers lists (112) from the multiple reporting printers to create the listing engine non-authenticated identifier list (110) that reflects the activity of multiple printers.

The non-authenticated print cartridges may be denied authentication for any appropriate reason. For example, if the digital signature (104) found in the print cartridge's memory (106) fails to match what the printer (102) expected, the printer (102) will deny authentication and send the print cartridge's identifier to the common location. In other examples, the printer (102) can deny authentication if the identifier appears to be corrupted. In yet other examples, the printer (102) can deny authentication if the identifier appears to have been used by multiple printers because that would suggest that at least one of the print cartridges was an unauthorized copy. While this example has been described with reference to specific reasons that a printer (102) may deny authentication to a print cartridge (100), any appropriate reason for denying authentication may be used in accordance with the principles described herein.

A communicator (118) of the printer (102) may communicate with the listing engine (114) when internet connectivity exists. To ensure that the printer (102) has access to the listing engine non-authenticated identifier list (110) when internet connectivity is down, the printer (102) may download the identifiers from the listing engine non-authenticated identifier list (110). However, in examples where the listing engine non-authenticated identifier list (110) exceeds the amount of memory available in the printer (102), the printer (102) may download just a portion of the listing engine non-authenticated identifier list (110). When the printer (102) downloads (a portion of) the listing engine non-authenticated identifier list (110), it adds this to its local printer non-authenticated identifiers list (112).

The listing engine non-authenticated identifier list (110) may be organized in a manner that allows the printer (102) to download a relevant portion of the listing engine non-authenticated identifier list (110). For example, the listing engine non-authenticated identifier list (110) may be sorted by geography. In such a manner, the printer (102) may download the portion of the listing engine non-authenticated identifier list (110) within the geography that the printer (102) is in. In this manner, the printer (102) avoids downloading non-authenticated print cartridges that are denied authentication in a different region of the world than where the printer (102) is located. In other examples, the listing engine non-authenticated identifier list (110) is sorted chronologically. In such an example, the identifiers of the most recently non-authenticated print cartridges may be listed first so that the printer (102) can download those identifiers that reflect the identifiers that are currently being denied authentication. In yet another example, the listing engine non-authenticated identifier list (110) may be sorted by the frequency that the failed authentication has occurred. In this example, the printer (102) can download the identifiers that were most commonly denied authentication. A listing engine non-authenticated identifier list (110) organized by frequency of failed authentication may provide valuable protection against using a non-authenticated print cartridge because a third party may try to just duplicate a few print cartridges many times instead of trying to duplicate many print cartridges many times.

The printer (102) may download all or just a portion of the identifiers in the listing engine non-authenticated identifier list (110) on a periodic basis. In other examples, the printer (102) downloads the non-authentic identifiers as instructed by a user or by the listing engine (114). In some examples, the printer (102) actively retrieves information from the listing engine non-authenticated identifier list (110). However, in other examples, the printer (102) passively receives information from the listing engine non-authenticated identifier list (110). Downloading the identifiers from the listing engine non-authenticated identifier list (110) may include downloading the entire list or just downloading updates to the listing engine non-authenticated identifier list (110).

The principles described herein include the advantages of authenticating the print cartridge at the time when the print cartridge is installed into the printer. As a result, internet connectivity does not have to be established at the time that the print cartridge is installed. Thus, the printer can use the print cartridge with confidence of its authenticity immediately without having to rely on an active internet connection to begin the authentication process. In other examples where the printer will not allow for use of a print cartridge until authentication is completed, authentication performed locally at the printer allows the print cartridge to be used shortly after installation when there is no internet connectivity because the authentication process does not rely on the internet connection at the time of installation.

In some examples, the printer (102) begins the authentication session by first attempting to authenticate the hardware of the print cartridge (100). If authentication of the hardware is successful, the printer (102) continues to authenticate the digital signature (104) stored in the print cartridge (100). Thus, the authentication of the digital signature (104) is a second layer of protection to determine if the print cartridges are genuine. If both the digital signature (104) and the hardware appear to be genuine, the printer (102) then implements the comparison between the identifier (108) in the signed data with the identifiers from the printer non-authenticated identifiers list (112). Thus, the comparison acts as a third or an additional layer of protection. While this example has been described with reference to specific layers that verify whether a consumable product is genuine, any appropriate number of layers may be implemented in accordance with the principles described herein. Any appropriate layer to determine authenticity may be implemented in any appropriate order. Further, additional types of layers not described in this specification may also be implemented as other layers, which may be inserted into the authentication process in any appropriate sequence.

In some examples, the printer (102) is in communication with a remote device, such as a remote server (117). The remote server (117) may be connected over a public network, like the internet, or over a private network. The remote server (117) may have memory (119) that stores at least a portion of the non-authenticated print cartridge list, the public key, an authentication engine, or combinations thereof. In some examples, the computer readable instructions and hardware for authenticating the print cartridge (100) are distributed across the printer (102), the remote device, another device connected to the remote device or printer (102), or combinations thereof.

Figure 1B:
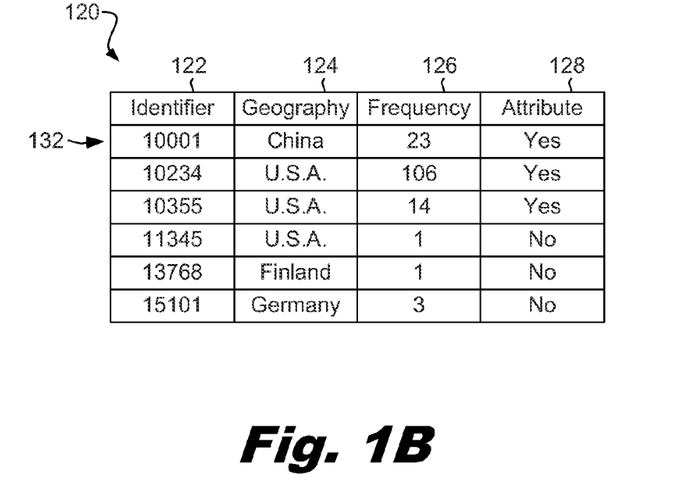
FIG. 1B is a diagram of an example of a list of non-authenticated consumable products according to the principles described herein.

FIG. 1B is a diagram of an example of a list (120) of non-authenticated consumable products in a listing engine according to the principles described herein. In this example, the list (120) includes multiple columns and multiple rows. Each column represents an attribute of the consumable product. A first column (122) represents the identifier associated with the non-authenticated consumable product. The second column (124) represents a geographic region where the consumable product failed authentication. The third column (126) represents the number of times that a consumable product associated with the identifier has failed authentication. The fourth column (128) represents whether the consumable product has a specific attribute. The rows each represent a single consumable product. For example, the first row (132) represents a consumable product that has an identifier of 10001 that failed authentication in China, that has failed authentication twenty three times and that contains the specific attribute.

The list (120) may be sorted in any appropriate manner. For example, the list (120) may be sorted by identifier, geographic region, frequency of authentication failure, attributes of the consumable product, another attribute, or combinations thereof. In this manner, the list (120) may be organized in an order that is useful for a device to determine when there is a match between the consumable product's identifier and the identifiers on the list (120), especially when there is limited space in the device's memory.

In other examples, the identifiers associated with frequency of failed authentication or geographic regions are prioritized in the list such that the devices with similar properties can download portions of the list that are relevant to them. For example, a device located in China may not find an identifier associated with consumable products that are failing authentication in Finland to be very relevant. Likewise, an identifier that is frequently failing authentication may represent an identifier that has been replicated multiple times and is therefore more likely to be installed in another device. Thus, identifiers with a higher frequency of occurred failure may be more relevant than identifiers associated with just a single or a few failed authentications.

As part of the device's agreement with the listing engine (114), the device may provide the listing engine (114) with preferences for how to organize the list (120) for the device. For example, the device may indicate its location and other attributes that may assist the listing engine (114) in determining an appropriate list arrangement that is particular to the device. In other examples, the listing engine (114) organizes the list in an order that is likely to assist a wide group of the devices, such as by frequency of occurred failure. In other examples, the listing engine (114) follows an ordering policy that has multiple rules for how to organize the list (120) based on various factors. While this example has been described with reference to specific types of attributes to include in the list (120), any appropriate type of attribute may be included in the list (120) in accordance with the principles described herein. Further, while this example has been described with reference to specific mechanisms for organizing the list (120), any appropriate mechanism for organizing the list (120) may be used in accordance with the principles described herein.

Figure 2:
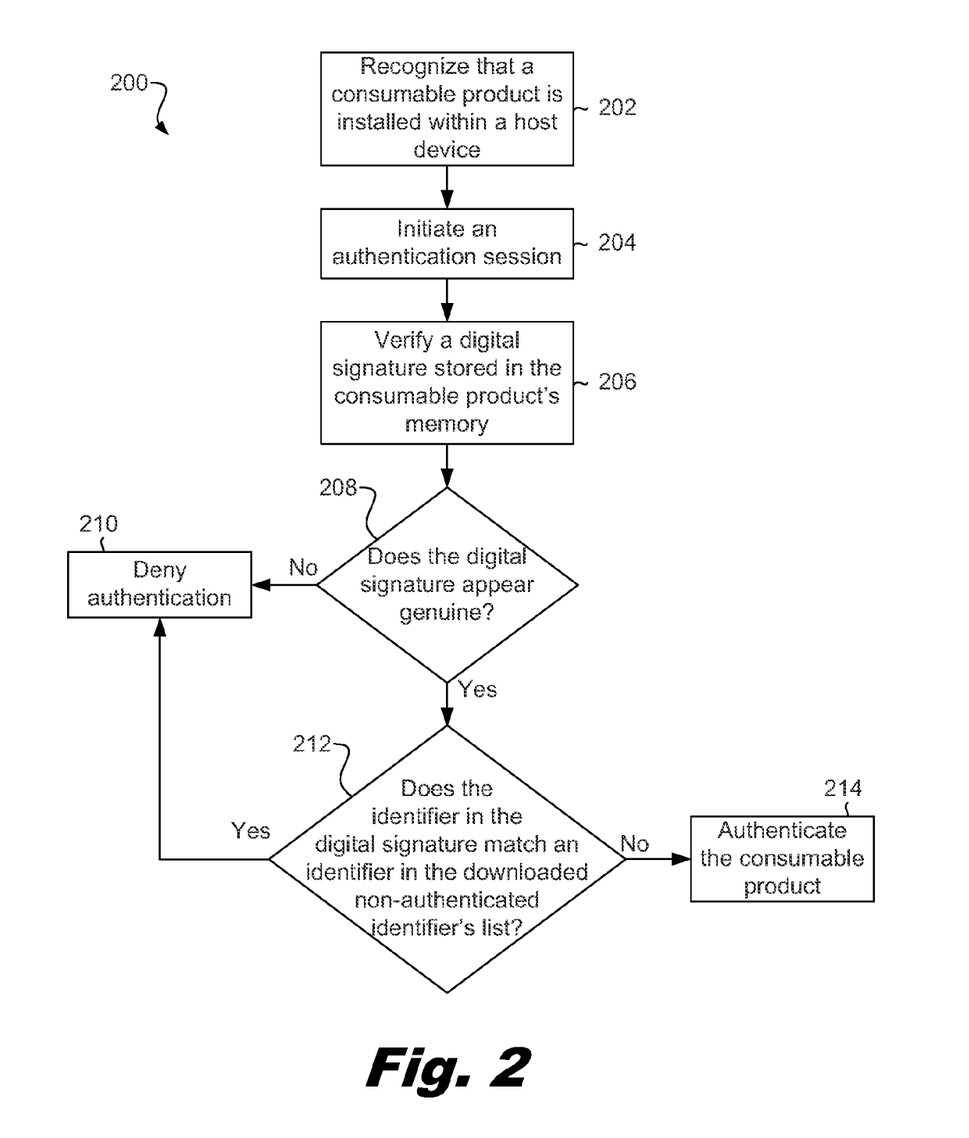
FIG. 2 is a flowchart of an example of a process of a method of determining authenticity of a consumable product according to the principles described herein.

FIG. 2 is a flowchart (200) of an example of a process for determining authenticity of a consumable product according to the principles described herein. In this example, the process includes recognizing (202) that a consumable product is installed within a host device, initiating (204) an authentication session with the consumable product, and verifying (206) a digital signature stored in the consumable product's memory.

The process also includes determining (208) whether the digital signature appears genuine. If the digital signature does not appear genuine, authentication is denied (210). On the other hand, if the digital signature appears genuine, the process continues with determining (212) whether the identifier in the signed data matches an identifier in the host device's non-authenticated identifiers list. If the identifier in the signed data fails to match any of the identifiers recorded in the host device's non-authenticated identifiers list, the consumable product is authenticated (214). However, if the identifier in the signed data matches one of the identifiers recorded in the host device's non-authenticated identifiers list, authentication is denied (210).

Figure 3A:
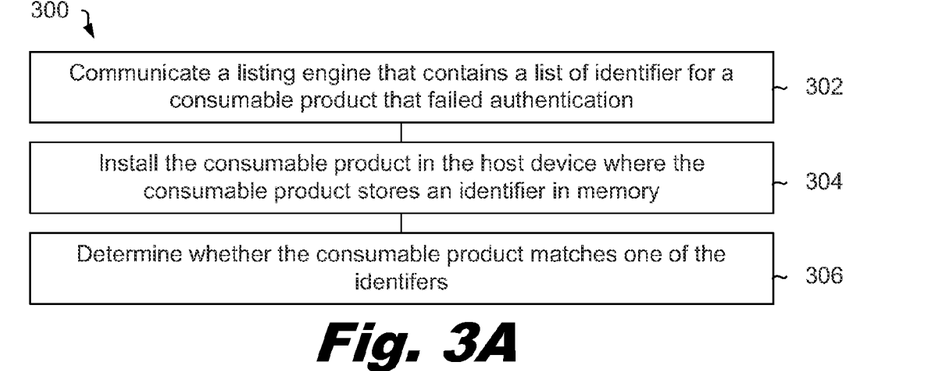
FIG. 3A is a diagram of an example of a method of determining authenticity of a consumable product according to the principles described herein.

FIG. 3A is a diagram of an example of a method (300) for determining authenticity of a consumable product according to the principles described herein. In this example, the method (300) includes communicating (302) with a listing engine that contains a list of identifiers for a consumable product that failed authentication, installing (304) the consumable product in the host device where the consumable product stores an identifier in memory, and determining (306) whether the consumable product matches one of the identifiers. In some examples if the consumable product matches one of the identifiers, the non-authenticated consumable product is prevented from being used by the host device. In other examples, the non-authenticated consumable product is permitted to be used by the host device.

Figure 3B:
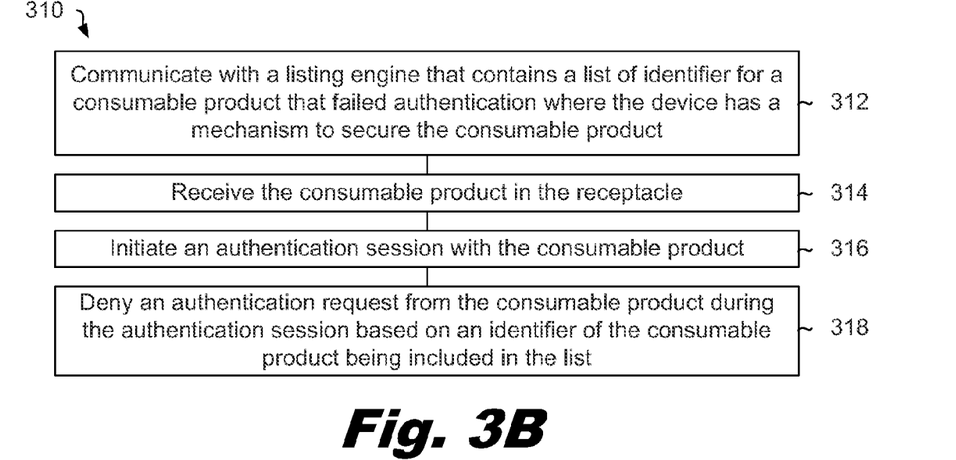
FIG. 3B is a diagram of an example of a method of determining authenticity of a consumable product according to the principles described herein.

FIG. 3B is a diagram of an example of a method (310) for determining authenticity of a consumable product according to the principles described herein. In this example, the method (310) includes communicating (312) with a listing engine that contains a list of identifiers for a consumable product that failed authentication where the device has a mechanism to secure the consumable product, receiving (314) the consumable product in the receptacle, initiating (316) the authentication session with the consumable product, and denying (318) an authentication request from the consumable product during the authentication session based on an identifier of the consumable product being included in the list.

In some examples, the device recognizes that the consumable product in communication with the device is inserted into the receptacle. As the consumable product is being inserted into the receptacle, the consumable product may establish communication with the device. Based on an authentication protocol, the authentication session may be initiated in response to the establishment of communication. While this example has been described with reference to a specific mechanism for connecting the consumable product to the device, any appropriate mechanism for securing the consumable product to the device may be used in accordance with the principles described herein. For example, the consumable device may be installed in the device through a thread interface, insertion into a receptacle, another attachment mechanism, or combinations thereof.

Figure 4:
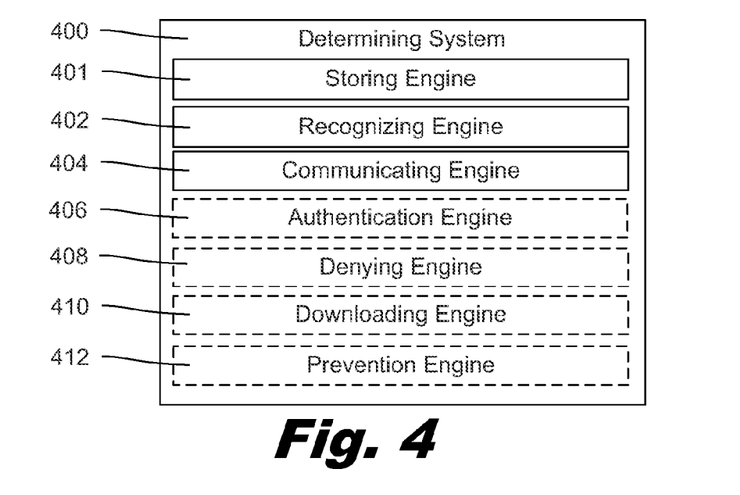
FIG. 4 is a diagram of an example of a determining system according to the principles described herein.

FIG. 4 is a diagram of an example of a determining system (400) according to the principles described herein. The determining system (400) can be a component of any appropriate device. For example, the determining system (400) may be incorporated into a printer, distant device, a service, a network device, a computing device, smart phone, a tablet, a personal computer, a desktop, a laptop, a watch, a digital device, or combinations. The determining system (400) includes a storing engine (401), a recognizing engine (402), and a communicating engine (404). In this example, the determining system (400) includes an authentication engine (406), a denying engine (408), a downloading engine (410), and a prevention engine (412). The engines (401, 402, 404, 406, 408, 410, 412) refer to a combination of hardware and program instructions to perform a designated function. Each of the engines (401, 402, 404, 406, 408, 410, 412) may include a processor and memory. The program instructions are stored in the memory and cause the processor to execute the designated function of the engine.

The storing engine (401) stores an identifier in a memory of the consumable product that is unique to the consumable product. The recognizing engine (402) recognizes that the consumable product is in communication with the device and that the consumable product should be subjected to an authentication process. The authentication engine (406) initiates the authentication session between the consumable product and the device. If the digital signature contained in the memory of the consumable product appears to be genuine, then the authentication engine (406) continues to determine the consumable product's authenticity by comparing the identifier associated with the consumable product with the identifiers in a non-authenticated identifiers list. The communicating engine (404) enrolls the device in an agreement with a remote listing engine that gives the device access to the list. The downloading engine (410) downloads the list from a remote location maintained by the listing engine to ensure that the list is available when internet connectivity is down. The storing engine (401) further stores the list of non-authenticated identifiers.

Further, the authentication process is quicker when the list is locally stored versus remotely consulting the list each time that the consumable device is seeking authentication. If the digital signature does not appear to be genuine or the consumable product's identifier matches one of the non-authenticated identifiers from the list, the denying engine (408) denies authentication to the consumable product. The prevention engine (412) is used to prevent the usage of the consumable product if authentication is denied.

While this example has been described as first determining whether a digital signature appears to be genuine, in some examples, the consumable product does not include a digital signature. In such examples, the identifier may be stored in the consumable product's memory, be stored with another mechanism other than with a digital signature, or combinations thereof. The authentication process may rely solely on comparing the identifier to the list of non-authenticated identifiers. In other examples, the authentication process includes other tasks performed during the authentication process of which comparing the consumable product's identifier to the list is one of the tasks.

Figure 5:
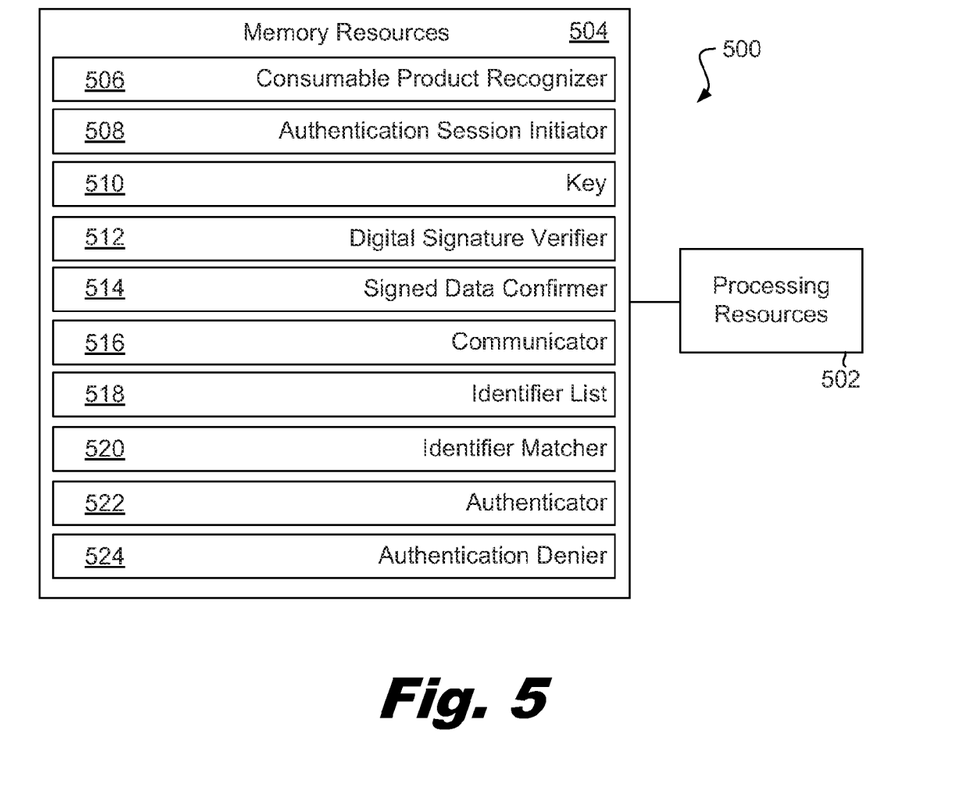
FIG. 5 is a diagram of an example of a determining system according to the principles described herein.

FIG. 5 is a diagram of an example of a determining system (500) according to the principles described herein. The determining system (500) can be a component of any appropriate device. For example, the determining system (500) may be incorporated into a printer, distant device, a service, a network device, a computing device, smart phone, a tablet, a personal computer, a desktop, a laptop, a watch, a digital device, or combinations. In this example, the determining system (500) includes processing resources (502) that are in communication with memory resources (504). Processing resources (502) include at least one processor and other resources used to process programmed instructions. The memory resources (504) represent generally any memory capable of storing data such as programmed instructions or data structures used by the determining system (500). The programmed instructions shown stored in the memory resources (504) include a consumable product recognizer (506), an authentication session initiator (508), a digital signature verifier (512), a signed data confirmer (514), a communicator (516), an identifier matcher (520), an authenticator (522), and an authentication denier (524). The data structures shown stored in the memory resources (504) include a key (510) and identifier list (518).

The memory resources (504) include a computer readable storage medium that contains computer readable program code to cause tasks to be executed by the processing resources (502). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable programmable read only memory, magnetic storage media, other types of memory, or combinations thereof.

The consumable product recognizer (506) represents programmed instructions that, when executed, cause the processing resources (502) to recognize that a consumable product is in a condition to be authenticated. For example, the device may recognize that the consumable product is in a condition to be authenticated if the consumable product is communicating with the device, the consumable product has sent a request for authentication, the consumable product is secured to the device, another condition, or combinations thereof. The authentication session initiator (508) represents programmed instructions that, when executed, cause the processing resources (502) to initiate an authentication session between the device and the consumable product.

The digital signature verifier (512) represents programmed instructions that, when executed, cause the processing resources (502) to verify a digital signature stored in the memory of the consumable product with the key (510). The signed data confirmer (514) represents programmed instructions that, when executed, cause the processing resources (502) to confirm that the signed data appears to be genuine. If the signed data confirmer (514) cannot make such a confirmation, authentication is denied.

The communicator (516) represents programmed instructions that, when executed, cause the processing resources (502) to communicate with a remote listing engine for a list of non-authenticated identifiers that are stored in a remote location. The communicator (516) causes the list, or at least a portion of the list, to be downloaded to the device. The downloaded list, or portion of the list, populates the identifier list (518) with the non-authenticated identifiers.

The identifier matcher (520) represents programmed instructions that, when executed, cause the processing resources (502) to match an identifier found in the signed data with an identifier in the identifier list (518). If the identifier matcher (520) cannot match the identifier with one from the list, the consumable product is authenticated.

The authenticator (522) represents programmed instructions that, when executed, cause the processing resources (502) to authenticate the consumable product in response to determining that the digital signature is genuine and that its associated identifier does not match an identifier in the identifier list (518). The authentication denier (524) represents programmed instructions that, when executed, cause the processing resources (502) to deny authentication if it is determined that the consumable product's identifier matches an identifier from the list of non-authenticated identifiers.

Further, the memory resources (504) may be part of an installation package. In response to installing the installation package, the programmed instructions of the memory resources (504) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources (504) can include integrated memory such as a hard drive, a solid state hard drive, or the like.

In some examples, the processing resources (502) and the memory resources (504) are located within the same physical component, such as a server, or a network component. The memory resources (504) may be part of the physical component's main memory, caches, registers, non-volatile memory, or elsewhere in the physical component's memory hierarchy. Alternatively, the memory resources (504) may be in communication with the processing resources (502) over a network. Further, the data structures, such as the libraries may be accessed from a remote location over a network connection while the programmed instructions are located locally. Thus, the determining system (500) may be implemented on a user device, on a server, on a collection of servers, or combinations thereof.

The determining system (500) of FIG. 5 may be part of a general purpose computer. However, in alternative examples, the determining system (500) is part of an application specific integrated circuit.

While the examples above have been described with reference to specific mechanisms for verifying a digital signature, any appropriate mechanism for verifying a digital signature may be used in accordance with the principles described herein. Further, while the examples above have been described with reference to specific mechanisms for determining an identifier of a consumable product, any appropriate mechanism for determining an identifier of a consumable product may be used in accordance with the principles described herein.

Also, while the examples above have been described with reference to specific mechanisms for matching the identifiers of the current consumable product with the list of non-authenticated identifiers, any appropriate mechanism for matching identifiers may be used in accordance with the principles described herein. Additionally, while the examples above have been described with reference to specific mechanisms for determining which portions of the list to download to the device, any appropriate mechanism for determining which portions of the list to download may be used in accordance with the principles described herein. Further, the list, or the portions thereof, may be downloaded to the device or to another device associated with the device. For example, the list may be downloaded to a computer that is networked to the printer. In such examples, the computer may have additional memory to dedicate to storing the list, and accordingly, the computer may store a larger portion of the list of non-authenticated identifiers.

The host device may include specific measures to protect the host device's list from tampering or deletion. For example, the host device may include a policy of updating the list on a periodic basis to ensure that the list is accurate. While the above examples have been described with reference to mechanisms for protecting the non-authentic identifier list stored locally in the host device, any appropriate mechanism for protecting the local list may be implemented according to the principles described herein.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of determining an authenticity of a consumable product, comprising:
    communicating with a listing engine that contains a list of identifiers for consumable products classified as non-authentic, wherein the identifiers for consumable products classified as non-authentic are associated with at least one of:
        a geography of occurrence, and
        a frequency of failed authentications;
    installing the consumable product in a host device, wherein the consumable product stores an identifier in a memory; and
    determining whether the identifier stored in the consumable product matches one of the identifiers for consumable products classified as non-authentic.

2. The method of claim 1, further comprising verifying only a portion of the list of identifiers based on at least one of
    a geography of the host device, and
    the frequency of failed authentication.

3. The method of claim 1, further comprising denying an authentication request for the consumable product during an authentication session based on the identifier stored in the consumable product being included in the list of identifiers.

4. The method of claim 3, comprising preventing usage of the consumable product in response to denying the authentication request.

5. The method of claim 1, further comprising downloading a portion of the list of identifiers to the host device based on available or allocated memory in the host device.

6. The method of claim 1, wherein the host device is a printer and the consumable product is a print cartridge.

7. A device comprising:
    a processor; and
    a non-transitory storage medium storing instructions executable on the processor to:
        communicate, over a network, with an engine to download, from the engine, a list of identifiers of consumable products classified as non-authentic;
        store the downloaded list of identifiers at the device;

update, by communicating with the engine over the network, the downloaded list of identifiers stored at the device using an update to the list of identifiers at the engine;

in response to connection of a first consumable product to the device, determine whether a consumable product identifier stored in the first consumable product matches any identifier in the updated list of identifiers stored at the device; and deny authentication of the first consumable product in response to determining that the consumable product identifier matches an identifier in the updated list of identifiers stored at the device.

8. The device of claim 7, wherein the instructions are executable on the processor to initiate an authentication session between the device and the first consumable product.

9. The device of claim 8, wherein the denying of authentication is during the authentication session.

10. The device of claim 7, wherein the device is a printer and the first consumable product is a print cartridge.

11. The device of claim 7, wherein the instructions are executable on the processor to perform the updating on a periodic basis.

12. The device of claim 7, wherein the instructions are executable on the processor to perform the updating in response to a user request.

13. The device of claim 7, wherein the instructions are executable on the processor to perform the updating in response to the update to the list of identifiers becoming available at the engine.

14. The device of claim 7, wherein the identifiers in the updated list of identifiers stored at the device are associated with at least one of:

a geography of occurrence of a failed authentication, and a frequency of failed authentications.

15. A non-transitory computer readable storage medium storing computer readable instructions that when executed cause a device comprising a processor to:

recognize that a consumable product is connected to the device;

update a list of identifiers of consumable products classified as non-authentic, the list of identifiers stored at the device, and the updating comprising communicating, over a network, with a listing engine that contains a listing engine list of identifiers of consumable products classified as non-authentic;

initiate an authentication session between the device and the consumable product; and authenticate, using the updated list of identifiers, the consumable product during the authentication session.

16. The non-transitory computer readable storage medium of claim 15, wherein the computer readable instructions when executed cause the device to deny an authentication request from the consumable product during the authentication session in response to determining that an identifier of the consumable product is in the updated list of identifiers.

17. The non-transitory computer readable storage medium of claim 15, wherein the identifiers in the updated list of identifiers are associated with at least one of:

a geography of occurrence of a failed authentication, and a frequency of failed authentications.

18. The non-transitory computer readable storage medium of claim 15, wherein the instructions upon execution cause the device to perform the updating on a periodic basis.

19. The non-transitory computer readable storage medium of claim 15, wherein the instructions upon execution cause the device to perform the updating in response to a user request.

20. The non-transitory computer readable storage medium of claim 15, wherein the instructions upon execution cause the device to perform the updating in response to an update to the list of identifiers becoming available at the listing engine.

* * * * *

UNITED STATES PATENT AND TRADEMARK OFFICE
CERTIFICATE OF CORRECTION

PATENT NO.         : 9,599,945 B2
APPLICATION NO.    : 14/908709
DATED              : March 21, 2017
INVENTOR(S)        : Paul L. Jeran et al.

It is certified that error appears in the above-identified patent and that said Letters Patent is hereby corrected as shown below:

In the Drawings

In sheet 3 of 4, reference numeral 306, Line 2, delete "identifers" and insert -- identifiers --, therefor.

Signed and Sealed this
Twenty-eighth Day of November, 2017

Joseph Matal
*Performing the Functions and Duties of the*
*Under Secretary of Commerce for Intellectual Property and*
*Director of the United States Patent and Trademark Office*